US009521620B2

(12) United States Patent
Uchino et al.

(10) Patent No.: US 9,521,620 B2
(45) Date of Patent: Dec. 13, 2016

(54) USER EQUIPMENT AND DISCONTINUOUS RECEPTION CONTROL METHOD IN MOBILE COMMUNICATION SYSTEM

(71) Applicant: NTT DOCOMO, INC., Tokyo (JP)

(72) Inventors: Tooru Uchino, Tokyo (JP); Hideaki Takahashi, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 80 days.

(21) Appl. No.: 14/375,226

(22) PCT Filed: Mar. 11, 2013

(86) PCT No.: PCT/JP2013/056685
§ 371 (c)(1),
(2) Date: Jul. 29, 2014

(87) PCT Pub. No.: WO2013/137207
PCT Pub. Date: Sep. 19, 2013

(65) Prior Publication Data
US 2015/0043405 A1    Feb. 12, 2015

(30) Foreign Application Priority Data

Mar. 15, 2012  (JP) ................................. 2012-059343

(51) Int. Cl.
*H04W 52/02*  (2009.01)
*H04L 5/00*  (2006.01)
(Continued)

(52) U.S. Cl.
CPC .......... *H04W 52/0225* (2013.01); *H04L 5/001* (2013.01); *H04W 52/0216* (2013.01); *H04W 72/0406* (2013.01); *H04W 76/048* (2013.01)

(58) Field of Classification Search
CPC ...................................................... H04L 5/001
See application file for complete search history.

(56) References Cited

U.S. PATENT DOCUMENTS

| 9,042,315 | B2* | 5/2015 | Lin ....................... H04W 36/30 370/242 |
| 2011/0292854 | A1* | 12/2011 | Terry ...................... H04L 5/001 370/311 |
| 2012/0057490 | A1* | 3/2012 | Park ........................ H04L 5/001 370/252 |

FOREIGN PATENT DOCUMENTS

| EP | 2421325 A1 | 2/2012 |
| WO | 2010/126154 A1 | 11/2010 |

OTHER PUBLICATIONS

Huawei: "Details of CC (de)activation", 3GPP Draft: R2-102149 Details of CC (De)Activation, 3rd Generation Partnership Project (3GPP), Mobile Competence Center; 650, Route Des Lucioles; F-06921 Sophia-Antipolis Cedex; France, vol. RAN WG2, No. Beijing, China; Apr. 12, 2010-Apr. 16, 2010, Apr. 5, 2010 (Apr. 5, 2010), XP050605054, [Retrieved on Apr. 5, 2010] *Figure 1* *Paragraph [02.1]—Paragraph [02.2]*.

(Continued)

*Primary Examiner* — Khaled Kassim
*Assistant Examiner* — Zhaohui Yang
(74) *Attorney, Agent, or Firm* — Osha Liang LLP

(57) ABSTRACT

User equipment that is capable of communicating by using M (M is greater than or equal to 2) component carriers (CCs) includes N (N is greater than or equal to 2) communication units for executing radio communication with a base station by using each of the M CCs, a controller for individually controlling an operation mode of each of the N communication units; and a timer for reporting to the controller that a constant time period is elapsed without receiving a further control signal, after receiving, by a communication unit of the N communication units, a control signal from the base station. When a report from the timer is received for a specific communication unit of the N communication units, the controller controls the operation mode of the specific (Continued)

communication unit, so that the operation mode the specific communication unit discontinuously transitions to an active mode.

4 Claims, 14 Drawing Sheets

(51) Int. Cl.
*H04W 72/04* (2009.01)
*H04W 76/04* (2009.01)

(56) References Cited

OTHER PUBLICATIONS

Yi-Fan Zhang et al: "Delay analysis of DRX in LTE-advanced considering carrier aggregation", Journal of China Universities of Posts and Telecomunications, vol. 18, No. 6, Dec. 1, 2011 (Dec. 1, 2011), pp. 1-7, XP055218733, CN ISSN: 1005-8885, DOI: 10.1016/S1005-8885(10) 60115-X *figure 4* paragraph [02.2] (7 pages).
Office Action issued in corresponding Japanese Application No. 2012-059343 mailed on Sep. 29, 2015, and English translation thereof (5 pages).
International Search Report for corresponding International Application No. PCT/JP2013/056685, mailed May 14, 2013 (6 pages).
Written Opinion for corresponding International Application No. PCT/JP2013/056685, mailed May 14, 2013 (3 pages).
3GPP TS 36.300 V10.6.0; "3rd Generation Partnership Project; Technical Specification Group Radio Access Network; Evolved Universal Terrestrial Radio Access (E-UTRA) and Evolved Terrestrial Radio Access Network (E-UTRAN); Overall description; Stage 2 (Release 10);" Dec. 2011 (194 pages).
3GPP TS 36.321 V10.4.0; "3rd Generation Partnership Project; Technical Specification Group Radio Access Network; Evolved Universal Terrestrial Radio Access (E-UTRA); Medium Access Control (MAC) protocol specification (Release 10);" Dec. 2011 (54 pages).
CATT; "Implicit CC Deactivation;" 3GPP TSG RAN WG2 Meeting #69bis, R2-102064; Beijing, China; Apr. 12-16, 2009 (3 pages).
Nokia Siemens Networks, Nokia Corporation; "DRX in Carrier Aggregation—Active Time;" 3GPP TSG-RAN WG2 Meeting #69, R2-101527; San Francisco, U.S.A.; Feb. 22-26, 2010 (4 pages).
Pantech; "Considerations on DL CC activation with common DRX;" 3GPP TSG RAN WG2 Meeting #69bis, R2-102202; Beijing, China; Apr. 12-16, 2010 (4 pages).
Office Action issued in corresponding Japanese Application No. 2012-059343, mailed on Jan. 5, 2016 (5 pages).
Office Action issued in corresponding European Application No. 13 760 693.5, mailed on Jun. 27, 2016 (4 pages).
Extended European Search Report issued in corresponding European Application No. 13760693.5 dated Oct. 14, 2015 (8 pages).
Huawei: "Details of CC (de)activation", 3GPP Draft: R2-102149 Details of CC (De)Activation, 3rd Generation Partnership Project (3GPP), Mobile Competence Center; 650, Route Des Lucioles; F-06921 Sophia-Antipolis Cedex; France, vol. RAN WG2, No. Beijing, China; 20100412-20100416, Apr. 5, 2010, XP050605054, [Retrieved on Apr. 5, 2010]*Figure 1* *Paragraph [02.1]—Paragraph [02.2]*
Yi-Fan Zhang et al: "Delay analysis of DRX in LTE-advanced considering carrier aggregation", Journal of China Universities of Posts and Telecomunications, vol. 18, No. 6, Dec. 1, 2011, pp. 1-7, XP055218733, CN ISSN: 1005-8885, DOI: 10.1016/S1005-8885(10) 60115-X *figure 4* paragraph [02.2] (7 pages).

* cited by examiner

USER EQUIPMENT AND DISCONTINUOUS RECEPTION CONTROL METHOD IN MOBILE COMMUNICATION SYSTEM

TECHNICAL FIELD

The present invention relates to user equipment and a discontinuous reception control method in a mobile communication system.

BACKGROUND ART

It is desirable that a mobile communication system can achieve high-speed, high-capacity, and low-latency. One method for achieving these is carrier aggregation (CA). When the CA is utilized, user equipment can use a plurality of carriers simultaneously. Each one of the plurality of carriers is referred to as a component carrier (CC). The individual CC corresponds to one system, such as a long-term evolution (LTE) mobile communication system or a 3G mobile communication system. The 3G mobile communication system includes, for example, mobile communication systems based on the W-CDMA scheme and the GSM scheme. The CA is used for an LTE-Advanced mobile communication system (cf., Non-Patent Document 1, for this point). Among a plurality of CCs that can be used by user equipment, one of the CCs is referred to as a main carrier or a primary component carrier (PCC), and the CCs other than the one of the CCs are referred to as secondary component carriers (SCC). Processing of communication with the PCC and the SCCs includes cell search, measurement, and monitoring of a radio link, as well as transmission and reception of control information and user data.

In contrast, user equipment satisfying a specific condition operates in a discontinuous reception (DRX) mode, so as to reduce battery energy consumption of the user equipment. For convenience of the explanation, it is assumed that there are two options for an operation mode of user equipment, which are a continuous reception mode and a discontinuous reception mode. For a case of a discontinuous reception mode, user equipment operates with a cycle that is referred to as a discontinuous reception cycle (DRX cycle). A mode of user equipment that operates in the discontinuous reception mode transitions to an active mode during a predetermined period (On-duration) per discontinuous reception cycle, and transitions to an inactive mode until the following cycle after elapse of the period. When user equipment that is operating in a continuous reception mode receives a downlink control signal from a base station, the user equipment activates a timer (drx-inactivity timer), and when a constant time period is elapsed without receiving a further downlink control signal by the user equipment, the mode of the user equipment transitions to a discontinuous reception mode. A specific example of the downlink control signal may be a physical downlink control channel (PDCCH) of an LTE mobile communication system. However, the downlink control signal is not limited to this. Here, a continuous reception mode is a mode other than a discontinuous reception mode. Note that a continuous reception mode includes, for example, a mode of receiving a downlink control signal for each subframe, and it is not necessarily that downlink control signals are continuously received. Such a discontinuous reception (DRX) control is described in Non-Patent Document 2.

It can be considered to execute DRX control during execution of carrier aggregation (CA). However, when DRX control according to related art is applied to the CA as it is, and when a constant time period is elapsed without receiving, for each of the CCs, a downlink control signal, the user equipment may transition to a discontinuous reception mode.

However, communication traffic for the component carriers of the plurality of component carriers (CCs) is not necessarily uniform. For example, traffic may hardly occur for a first CC, while a significant amount of traffic may occur in a second CC. If user equipment were unable to transition to a discontinuous reception mode unless no downlink control signal is received for a constant time period for the first CC and for the second CC, the user equipment would wastefully keep a signal processor for the first CC running. In such a case, battery energy may be consumed more than necessary. As described above, a problem of concern is that DRX control according to related art may not be efficient for a mobile communication system in which carrier aggregation (CA) can be executed.

RELATED ART DOCUMENT

Non-Patent Document

[NON-PATENT DOCUMENT 1] 3GPP, TS36.300, V10.6.0 (2011-12)
[NON-PATENT DOCUMENT 2] 3GPP, TS36.321, V10.4.0 (2011-12)

SUMMARY OF THE INVENTION

Problem to be Solved by the Invention

An object of the present invention is to enhance a battery saving effect by a discontinuous reception control for user equipment which is allowed to use a plurality of carriers through carrier aggregation (CA).

Means for Solving the Problem

User equipment according to an embodiment is user equipment that is capable of communicating by using M (M is greater than or equal to 2) component carriers (CCs) through carrier aggregation. The user apparatus includes N (N is greater than or equal to 2) communication units configured to execute radio communication with a base station by using each of the M component carriers; a controller configured to individually control an operation mode of each of the N communication units; and a timer configured to report to the controller that a constant time period is elapsed without receiving a further control signal, after receiving, by a communication unit of the N communication units, a control signal from the base station. When a report from the timer is received for a specific communication unit of the N communication units, the controller is configured to control the operation mode of the specific communication unit, so that a mode the specific communication unit discontinuously transitions to an active mode.

Effect of the Present Invention

According to the embodiment, in the user equipment that is allowed to use the plurality of carriers by the carrier aggregation (CA), the battery saving effect by the discontinuous reception control can be enhanced.

EMBODIMENTS FOR CARRYING OUT THE INVENTION

Figure 1:
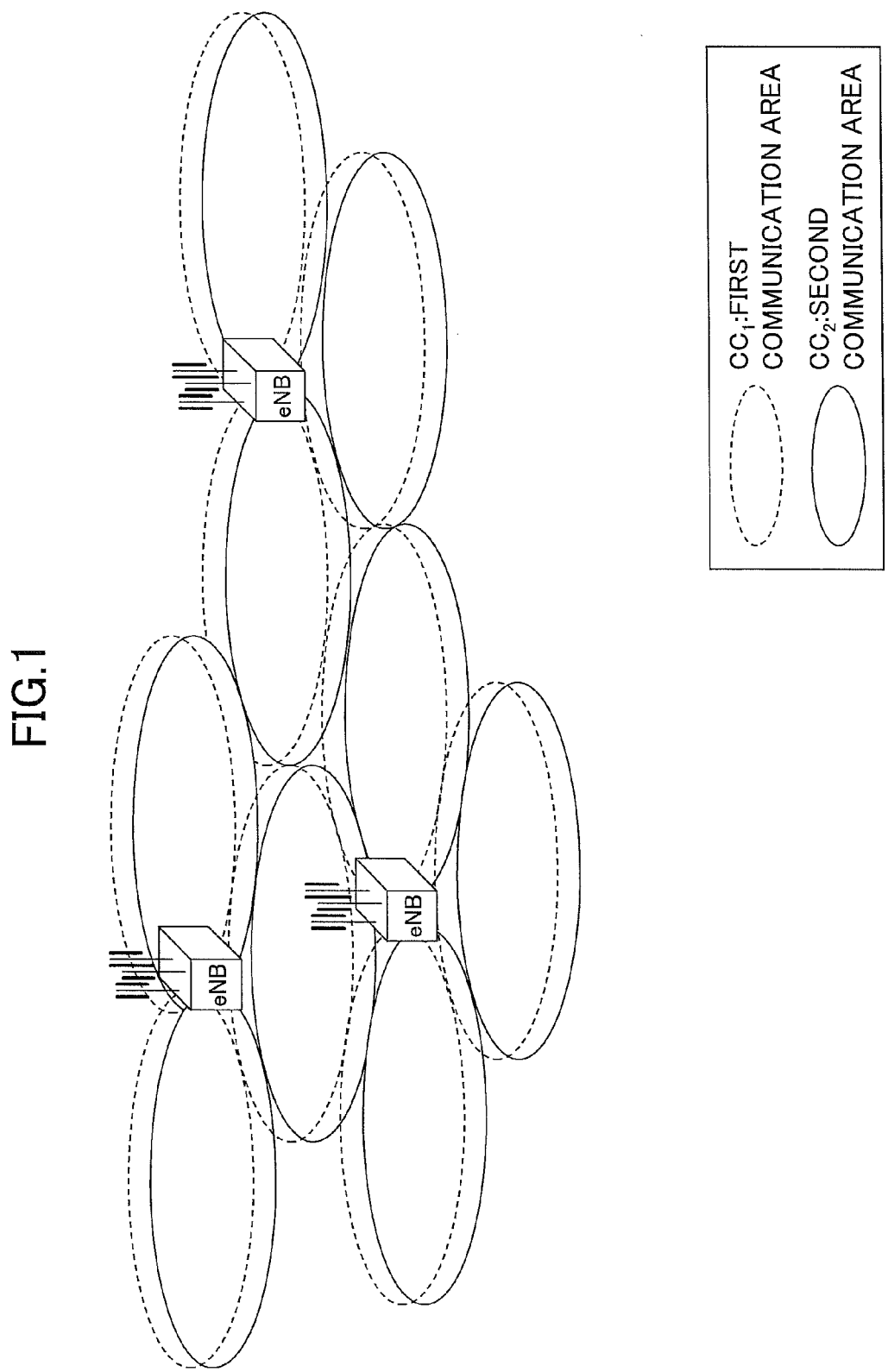
FIG. 1 is a diagram showing an example of a communication system.

Hereinafter, an embodiment is explained by referring to the accompanying drawings. In the drawings, identical reference numerals or identical reference symbols are attached to similar elements. The embodiment is explained from the following perspectives.
1. Communication system
1.1 Carrier aggregation
1.2 DRX control
2. User equipment
3. Operation example
4. Modified example

1. Communication System

FIG. 1 shows a communication system that is used in one embodiment. In the following explanation, a communication system is assumed to be an LTE-Advanced system. However, the present invention can be applied to any suitable communication system that can execute carrier aggregation and discontinuous reception control. The depicted communication system includes, at least, a base station (eNB) and user equipment (UE). The base station (eNB) and the user equipment (UE) communicate in accordance with an LTE-Advanced scheme. Typically, the user equipment (UE) can be a mobile station. However, the user equipment (UE) can be a fixed station.

<<1.1 Carrier Aggregation>>

In the communication system, a cell (first communication area) in which a first component carrier ($CC_1$ in FIG. 1) is used and a cell (second communication area) in which a second component carrier ($CC_2$ in FIG. 1) is used overlap at least in a part of an area. In the overlapped area, both the $CC_1$ and $CC_2$ can be used for communication. Accordingly, in the overlapped area, carrier aggregation can be executed.

For simplicity of depiction, only the two component carriers $CC_1$ and $CC_2$ are shown. However, in addition to the first and second component carriers $CC_1$ and $CC_2$, the third and forth component carriers $CC_3$ and $CC_4$ may exist. In the explanation below, it is assumed that the carrier aggregation (CA) is executed by using the $CC_1$ and $CC_2$. Furthermore, the $CC_1$ is a primary component carrier (PCC), and the $CC_2$ is a secondary component carrier (SCC). Here, when three or more component carriers $CC_1$, $CC_2$, and $CC_3$ exist, the $CC_1$ is the PCC, and the remaining $CC_2$ and $CC_3$ are SCCs. The PCC is a component carrier for securing connection of the user equipment (UE), and the SCC is a component carrier that is suitably added or deleted in response to a traffic amount. A process of switching a state of a component carrier (CC) to be a state in which communication is enabled is referred to as "activation," and a process of switching the state of the CC to be a state in which communication is disabled is referred to as "deactivation." In the communication system, among CCs that can be used, which CC is to be the PCC and which CC is to be the SCC are uniquely determined during establishment of a connection of the user equipment (UE) to the base station (eNB), or are reported to the user equipment (UE) from the base station (eNB). This reporting can be executed by RRC signaling.

Figure 2:
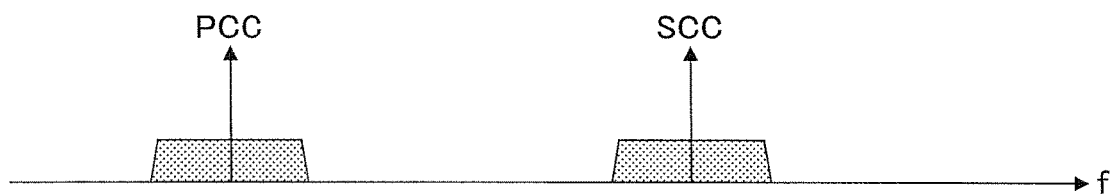
FIG. 2 is a diagram showing a PCC and a SCC.
Figure 3:
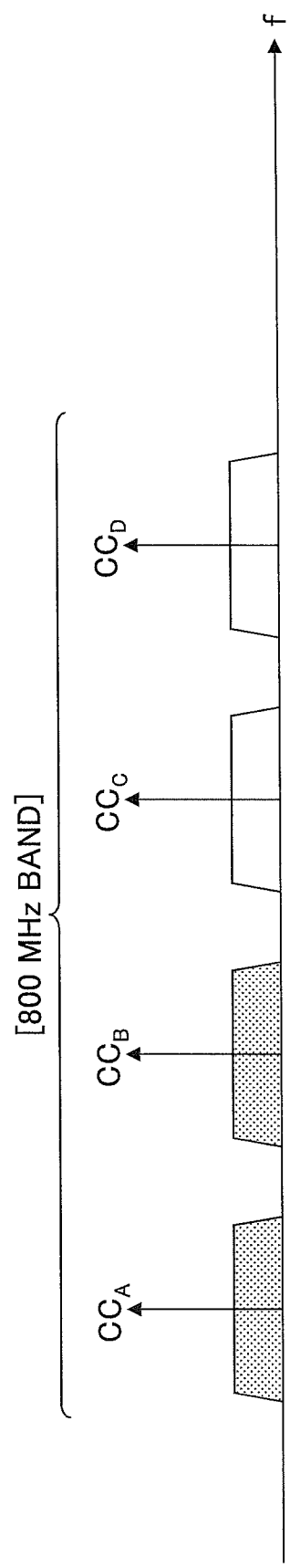
FIG. 3 is a diagram showing an example in which two of $CC_A$-$CC_D$ belonging to a frequency band, which are $CC_A$ and $CC_B$, are used through carrier aggregation.
Figure 4:
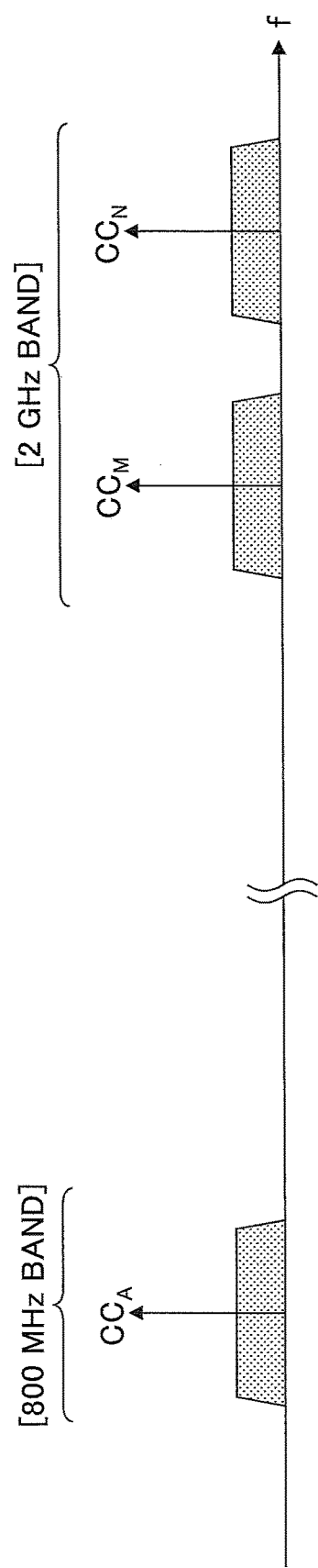
FIG. 4 is a diagram showing an example in which $CC_A$, $CC_M$, and $CC_N$, which belong to different frequency bands, are used through the carrier aggregation.

FIG. 2 shows a situation in which, between the two component carriers (CCs), one (on the left side) is designated as the primary component carrier (PCC), and the other one (on the right side) is designated as the secondary component carrier (SCC). The user equipment (UE) can communicate by using a plurality of CCs in accordance with a report from the base station (eNB). The CCs that are to be targets of the carrier aggregation (CA) may be carriers within the same band (FIG. 3), or carriers in corresponding different bands (FIG. 4). For the case of the example shown in FIG. 3, the user equipment (UE) can simultaneously use the $CC_A$ and $CC_B$ through the CA, among the four component carriers $CC_A$-$CC_D$ that belong to the frequency band of 800 MHz. For the case of the example shown in FIG. 4, the user equipment (UE) can simultaneously use the three CCs in total, which are the $CC_A$ belonging to the frequency band of 800 MHz, and the $CC_M$ and $CC_N$ belonging to the frequency band of 2 GHz. A manner of designating the CC is not limited to those of depicted in the figures. A desired manner of designation can be used. In FIGS. 2-4, for simplicity, the CCs are depicted so that each of the CCs has the same bandwidth. However, it is not essential. For example, for the case of the LTE communication system, a plurality of options may exist for the bandwidth of the component carrier (CC). Specifically, there are options of 1.4 MHz (6 pieces), 3 MHz (15 pieces), 5 MHz (25 pieces), 10 MHz (50 pieces), 15 MHz (75 pieces), and 20 MHz (100 pieces). Each number in the corresponding bracket indicates a number of resource blocks having the bandwidth of 180 kHz. Specific numerical values of the bandwidths of these CCs are merely examples, and any desirable values may be used.

Figure 5:
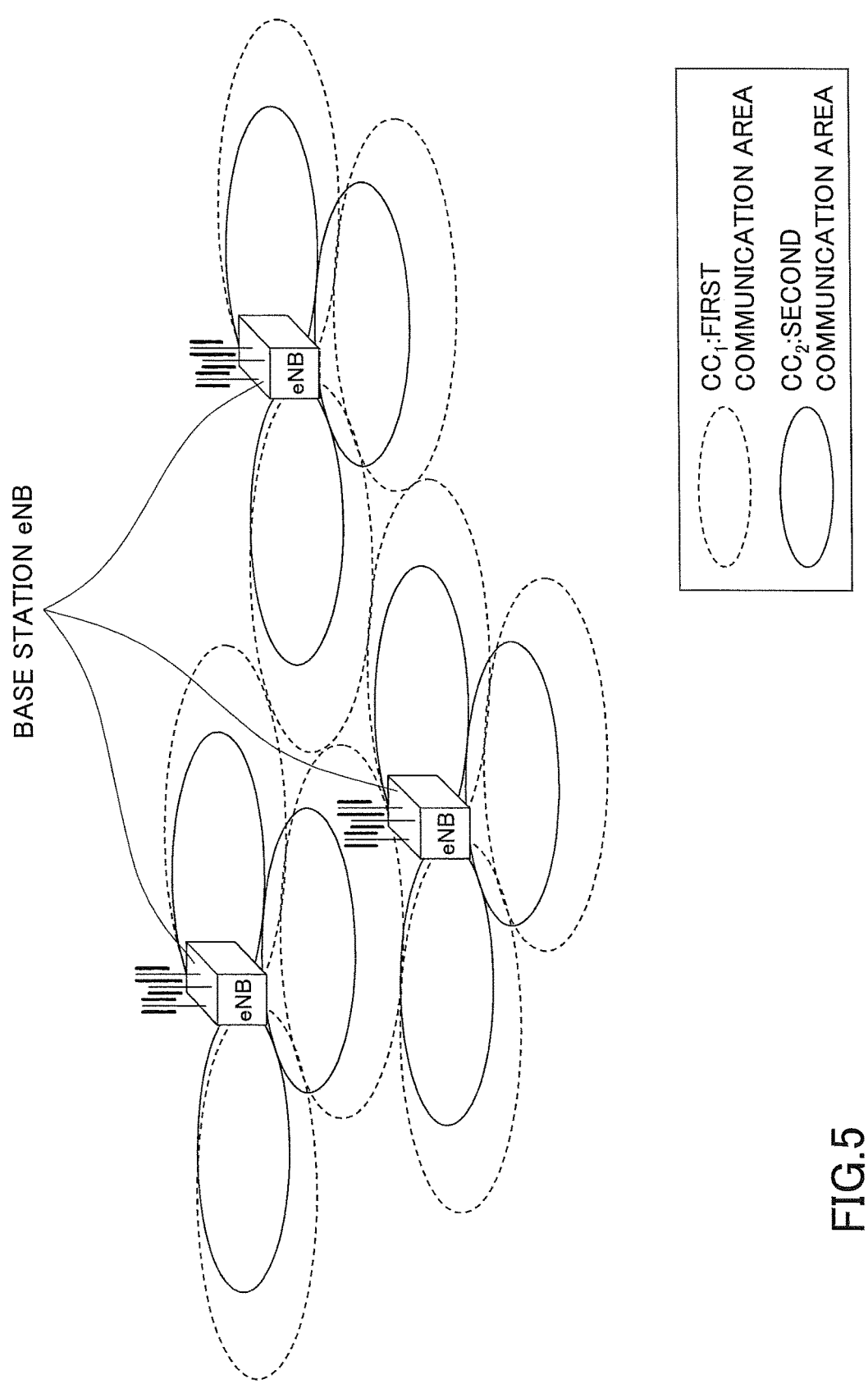
FIG. 5 is a diagram showing another example of the communication system.
Figure 6:
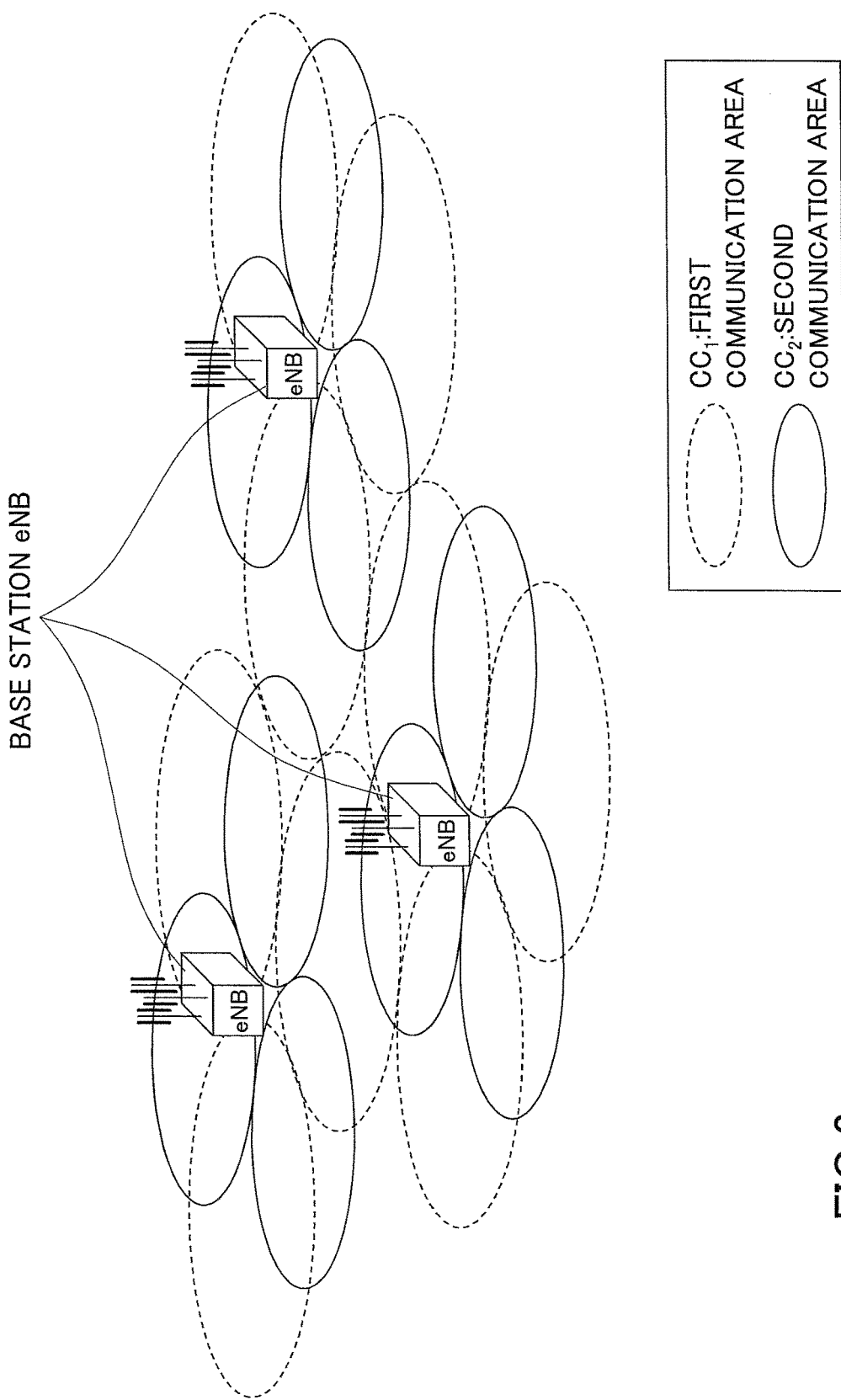
FIG. 6 is a diagram showing another example of the communication system.

For the case of the example shown in FIG. 1, the first communication area and the second communication area are almost completely overlapped geographically. However, it is not essential to the present invention. The overlapping of the first and second areas can be partial. For example, as shown in FIG. 5, the second communication area may exist inside the first communication area. This can be achieved, for example, by strongly transmitting, by the base station (eNB), a radio wave of the $CC_1$, and weakly transmitting, by the base station (eNB), a radio wave of the $CC_2$ in the same direction. Alternatively, as shown in FIG. 6, the area covered with the first communication area may be different from the area covered with the second communication area. This can be achieved, for example by transmitting, by the base station (eNB), a radio wave of $CC_1$ in a specific direction, and by transmitting, by the base station (eNB), a radio wave of $CC_2$ in a different direction.

Figure 7:
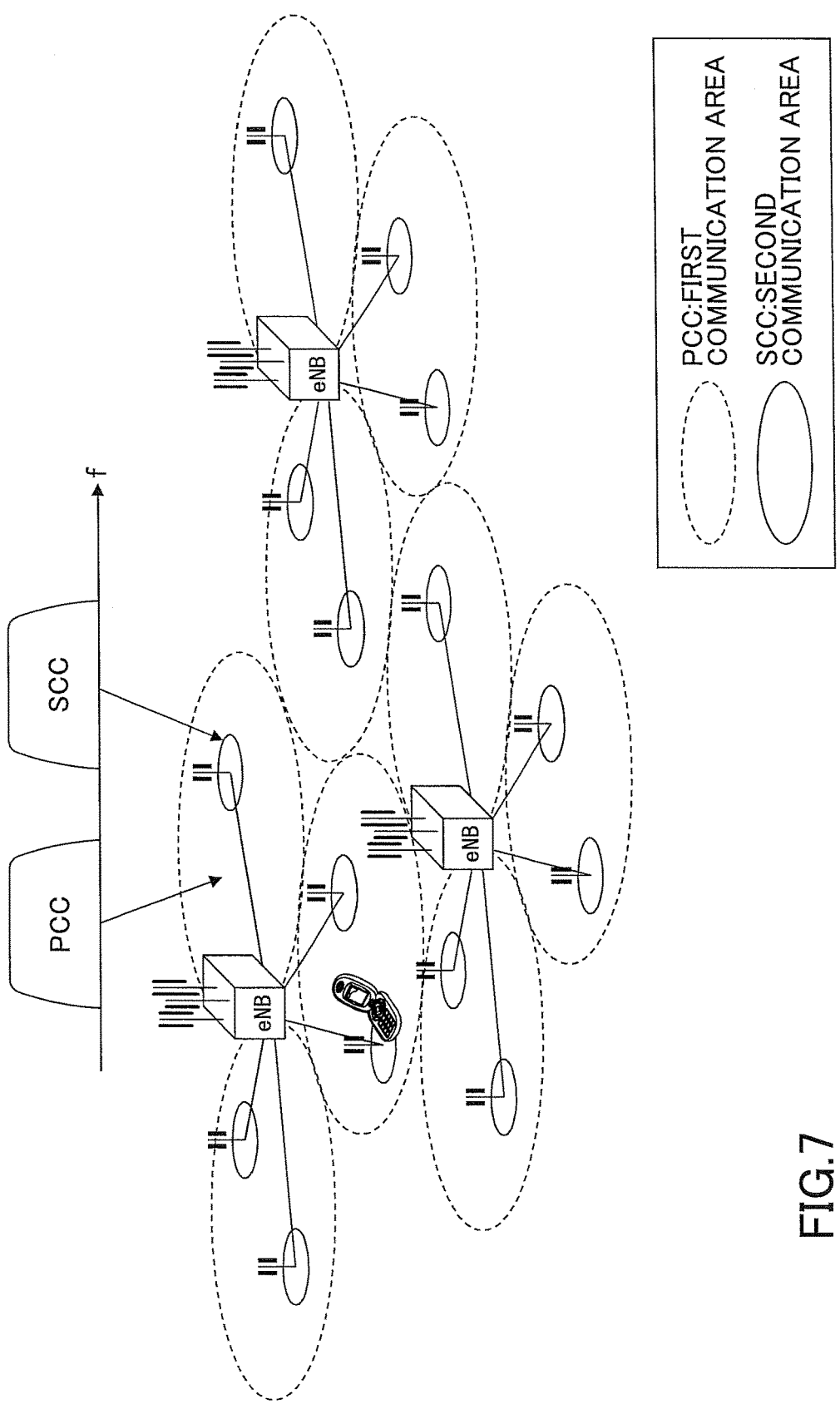
FIG. 7 is a diagram showing an example of a communication system using a heterogeneous network.

FIG. 7 further shows a different example of the communication system. For the case of the example shown in FIG. 7, the second communication area (SCC) is achieved by an extended radio unit that is connected to the base station (eNB). The communication system as a whole forms a heterogeneous network (HetNet). A heterogeneous network (HetNet) may also be referred to as a "heterogeneous mixed network" or a "heterogeneous wireless network." In the depicted example, a wide area, such as a macro cell, is covered with the first communication area (PCC), and a part of an area, such as a pico cell, is covered with the second communication area (SCC). The second communication area is not limited to the pico cell, and it can be, for example, a micro cell, a femto cell, or a closed subscriber group cell (CSG) and so forth. In either case, by setting an area of the first communication area (PCC) in which a traffic amount is significantly large to be the second communication area (SCC), offloading of the first communication area (PCC) can be achieved, thereby significantly improving the capacity of the network. The extended radio unit that is connected to the base station (eNB) through an optical fiber or the like can be relatively easily achieved. Accordingly, the second communication area (SCC) can be easily established as required. However, the method for achieving the second communication area is not limited to the depicted examples, and the second communication area may be achieved by any suitable method. In the second communication area (SCC), high quality communication with less path loss can be achieved. Accordingly, power consumption can be reduced in user equipment (UE). Furthermore, in the example shown in FIG. 7, it is desirable to use the primary component carrier (PCC) for communication of control plane (C-plane) data of the user equipment (UE), and to use the secondary component carrier (SCC) for communication of user plane (U-plane) data of the user equipment (UE).

<<1.2 DRX Control>>

In the communication system shown in FIGS. 1, and 5-7, the user equipment (UE) executes discontinuous reception (DRX) control for each component carrier (CC). Namely, for each of the $CC_1$ and the $CC_2$, the user equipment (UE) operates in a discontinuous reception mode under a specific condition. For convenience of the explanation, it is assumed that, for an operation mode of the user equipment, there are options of a continuous reception mode and a discontinuous reception mode.

Figure 8:
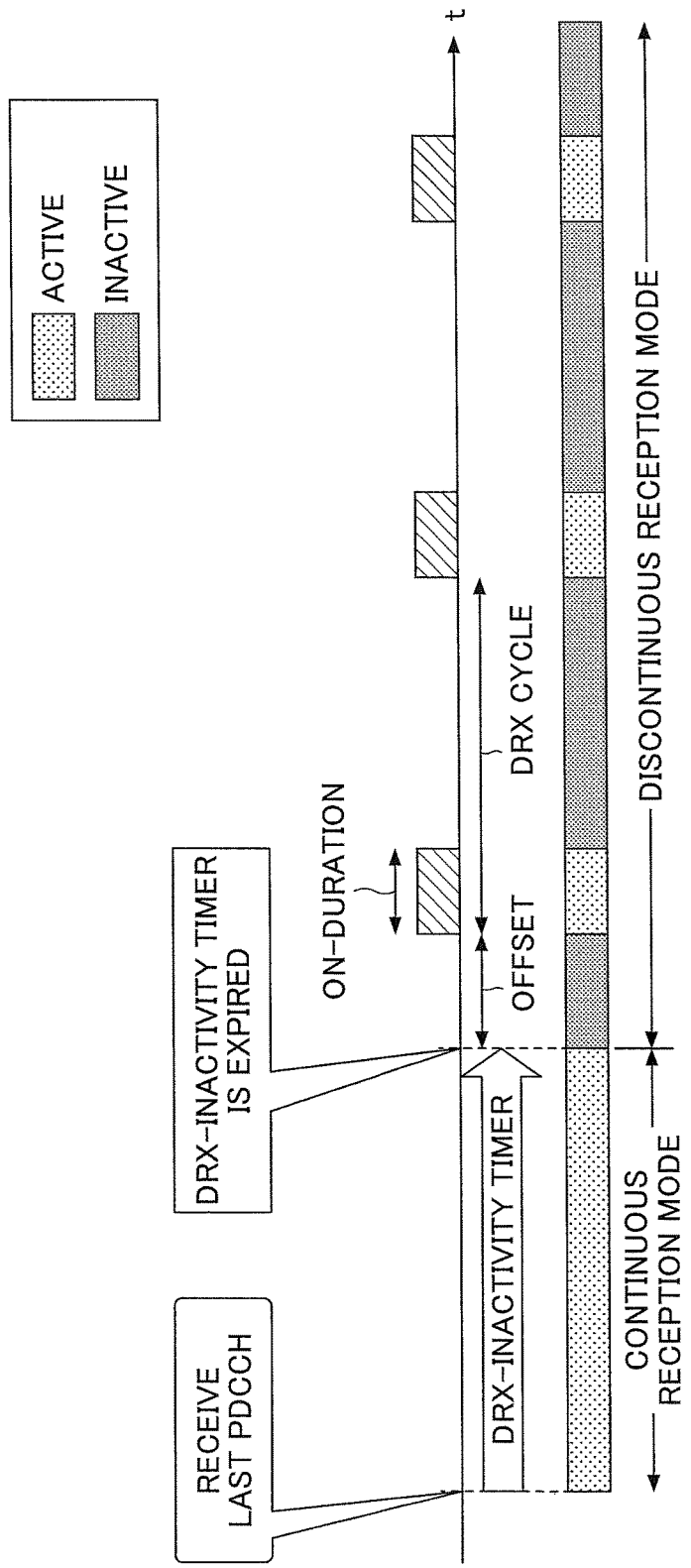
FIG. 8 is a diagram showing a situation in which a state transition is executed based on a timer.

FIG. 8 shows, for a specific single component carrier (CC), an example in which the mode of the user equipment (UE) transitions from the continuous reception mode to the discontinuous reception mode in accordance with a timer. In principle, the depicted operation is executed for each CC. As shown in the left side of the figure, the user equipment (UE) operates in the continuous reception mode, and the user equipment (UE) is always in an active mode. In this case, when the user equipment (UE) receives a downlink control signal (PDCCH) from the base station (eNB), a timer (drx-inactivity timer) is activated. When the timer is expired without receiving, by the user equipment (UE), a further downlink control signal, the mode of the user equipment (UE) transitions from the continuous reception mode to the discontinuous reception mode. After an offset time period is elapsed, an operation for each DRX cycle is started. Upon entering a DRX cycle, the mode of the user equipment (UE) is an active mode during predetermined On-duration, and after the On-duration, the mode of the user equipment (UE) transitions to an inactive mode until the next cycle. During the On-duration, the user equipment (UE) whose mode transitions to the active mode executes processing of cell search, measurement, and monitoring of a radio link, as well as monitoring of a downlink control signal (e.g., PDCCH).

Figure 9:
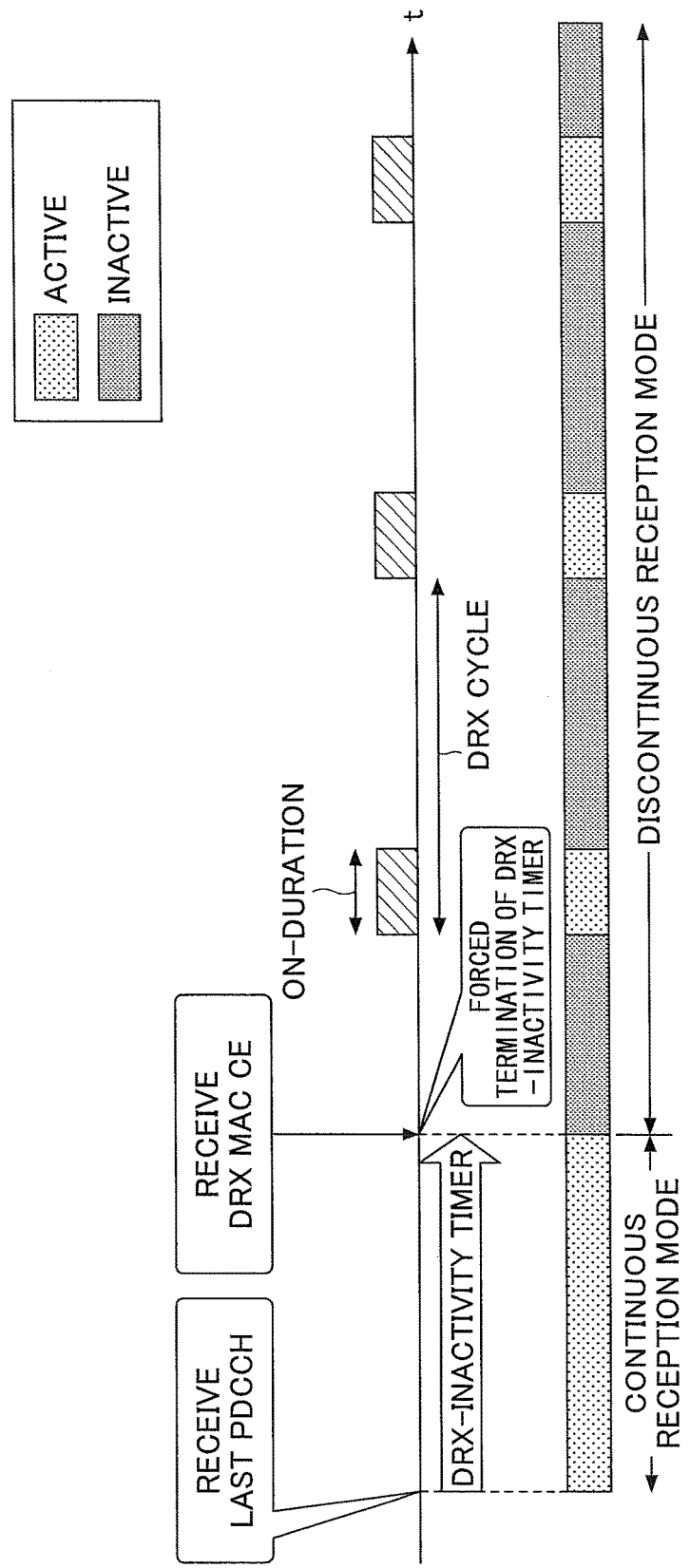
FIG. 9 is a diagram showing a situation in which the state transition is executed based on DRX_MAC_CE.

FIG. 9 shows, for a specific single component carrier, another example in which the mode of the user equipment (UE) transitions from the continuous reception mode to the discontinuous reception mode in accordance with the timer. In principle, the depicted operation is also executed for each CC. The example shown in FIG. 9 is the same as the example shown in FIG. 8 in the point that the state transition is executed; however, they are different in a trigger of the transition. As shown in the left side of the figure, the user equipment (UE) operates in a continuous reception mode, and it is always in the active mode. In this case, when the user equipment (UE) receives a downlink control signal (PDCCH) from the base station (eNB), a timer (drx-inactivity timer) is activated. Up to this point, it is the same as the example of FIG. 8. For the case of the example shown in FIG. 9, the user equipment (UE) receives a signal (DRX_MAX_CE or DRX_Command_MAC_Control_Element) including state control information from the base station (eNB) prior to expiration of the timer. The state control information indicates whether the user equipment (UE) is to be operated in the discontinuous reception state. In the current example, the state control information indicates that the user equipment (UE) is to be operated in the discontinuous reception mode. Consequently, the mode of the user equipment (UE) transitions to the discontinuous reception mode in response to receiving the signal (DRX_MAC_CE or DRX_Command_MAC_Control_Element) including the state control information, even if it is prior to expiration of the timer. The operation during the discontinuous reception mode is the same as that of explained by referring to FIG. 8.

2. User Equipment

Figure 10:
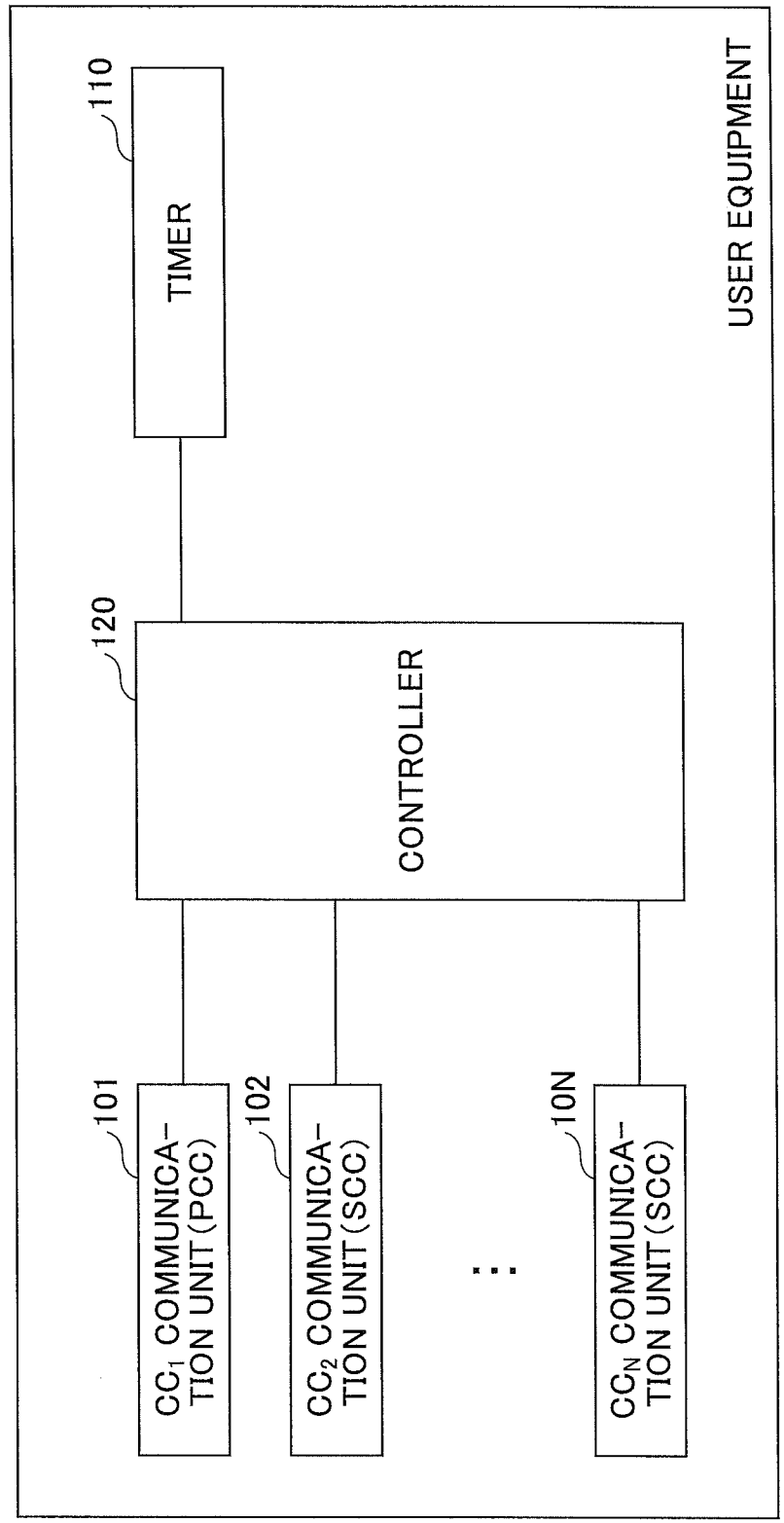
FIG. 10 is a functional block diagram showing an example of user equipment.

FIG. 10 shows an example of user equipment (UE). FIG. 10 illustratively shows elements that are particularly related to the embodiment of the present invention, among various functional elements and processing elements included in the user equipment. The user equipment (UE) includes, at least, a communication unit 101 for the first component carrier ($CC_1$); a communication unit 102 for the second component carrier ($CC_2$); . . . , a communication unit 10N for the N-th component carrier ($CC_N$); a timer 110, and a controller 120.

The user equipment (UE) is capable of communicating by using N (N is greater than or equal to 2) component carriers ($CC_1$, . . . , $CC_N$) through the carrier aggregation (CA). Among N $CC_i$ (i=1, . . . , N), two or more $CC_i$ that are reported from the base station (eNB) are used for the CA.

The $CC_1$ communication unit 101 is a communication unit for executing radio communication with the first component carrier ($CC_1$). The communication unit 101 includes a function of generating a signal that is to be transmitted by utilizing the $CC_1$ and transmitting the signal; a function of receiving a signal by utilizing the $CC_1$ and processing the signal; and a function of processing other processes. The other processes include, for example, cell search, measurement, monitoring of a radio link, and so forth. The signal received by the $CC_1$ communication unit 101 is, for example, a downlink control signal (PDCCH) in the $CC_1$ or a downlink data signal (PDSCH) in the $CC_1$. The signal transmitted by the $CC_1$ communication unit 101 is, for example, an uplink control signal (PUCCH) in the $CC_1$ and an uplink data signal (PUSCH) in the $CC_1$. In particular, the uplink control signal (PUSCH) may include feedback information, such as an indicator that indicates quality of a downlink radio link (CQI), a precoding matrix indicator (PMI), a rank indicator (RI), and a precoding type indicator (PRI).

Similar to the $CC_1$ communication unit 101, each of the $CC_2$ communication unit 102 to the $CC_N$ communication unit 10N is a communication unit for executing radio communication by utilizing the corresponding component carrier ($CC_1$). For convenience of the explanation, the first component carrier ($CC_1$) is assumed to be the primary component carrier (PCC), and the second to the N-th component carriers ($CC_2$-$CC_N$) are assumed to be the secondary component carriers (SCCs). Here, for convenience of the explanation, both the number of the component carriers and the number of the communication units are assumed to be N. However, it is not essential to the present invention, and these numbers may be different from each other. For example, communication for a plurality of component carriers may be executed by a single communication unit.

The timer 110 determines, for each of the N communication units of the $CC_1$-$CC_N$ communication units 101-10N, whether a fixed time period is elapsed without receiving a further control signal, after receiving a control signal from the base station (eNB). When the fixed time period is elapsed without receiving a further control signal, the timer 110 reports it to the controller 120. In principle, for each of the N component carriers of the $CC_1$-$CC_N$, one of the timers DIT_1-N may be assigned. Alternatively, for a plurality of SCCs that may be grouped, a common timer DIT_C may be assigned (this point is explained in the modified example). The lengths of the time periods that are measured by the corresponding timers DIT_1-N may be common for all the N component carriers, or may be different. Further, the lengths of the time periods that are measured by the corresponding timers DIT_1-N may always be constant, or may be suitably modified in accordance with an instruction from the base station (eNB).

Further, each of the timers that is managed by the timer 110 for the corresponding CC is not limited to the time period that is elapsed without receiving a further control signal after receiving a control signal (drx-inactivity timer). Another time period may be managed by the timer 110 for the corresponding CC. For example, for each of the CCs, the length of the DRX cycle, the On-duration in the discontinuous reception mode, an offset time period after transition to the discontinuous reception mode until activation for the first time (drx Start Offset), the time period that is used for retransmission (drx-Retransmission timer), and so forth may be managed. Here, a plurality of types of DRX periods may exist. For example, a short DRX cycle (drx-short cycle timer) and a long DRX cycle (drx-long cycle timer) may be defined. The short DRX cycle may be applied immediately after transition to the discontinuous reception mode. However, after a fixed time period is elapsed, the long DRX cycle may be applied. Further, in the timer 110, a time period that is defined for each user equipment (UE), and that is not defined for each CC may be measured. For example, during the initial access for which the drx-inactive timer is not assigned yet, the time period during which the mode is required to be the active mode (mac contention Resolution timer) may be measured by the timer 110 in the user equipment (UE).

The controller 120 individually controls operation modes of the N communication units of the communication unit 101 to 10N. The operation modes are the discontinuous reception mode during which it is discontinuously activated and the continuous reception mode during which it is continuously activated. Further, during the discontinuous reception mode and the continuous reception mode, the controller 120 determines whether the mode of the user equipment (UE) is required to be the active mode, and the controller 120 controls the operation modes of the N communication units of the $CC_1$-$CC_N$ communication units 101-10N depending on the determination result. In general, the active mode may correspond to one of the following cases. However, the present invention is not limited to these cases:

a case in which the On-duration timer is activated;
a case in which the drx-inactivity timer is activated;
a case in which the drx-Retransmission timer is activated;
a case in which the mac contention Resolution timer is activated;
a case in which a scheduling request is transmitted;
a case in which a resource is assigned for uplink retransmission; and
a case in which, after receiving a response signal (RA response) from the base station in a random access procedure, a downlink control signal (PDCCH) indicating a resource allocation is waited for.

The controller 120 controls the operation mode such that the operation mode becomes the inactive mode except for the active mode. For example, when the controller receives, for any of the N communication units of the $CC_1$-$CC_N$ communication units 101-10N, a report indicating expiration of a timer, the controller controls the operation state of the communication unit $10i$, so that the communication unit $10i$ corresponding to the report operates in the discontinuous reception mode.

3. Operation Example

Figure 11:
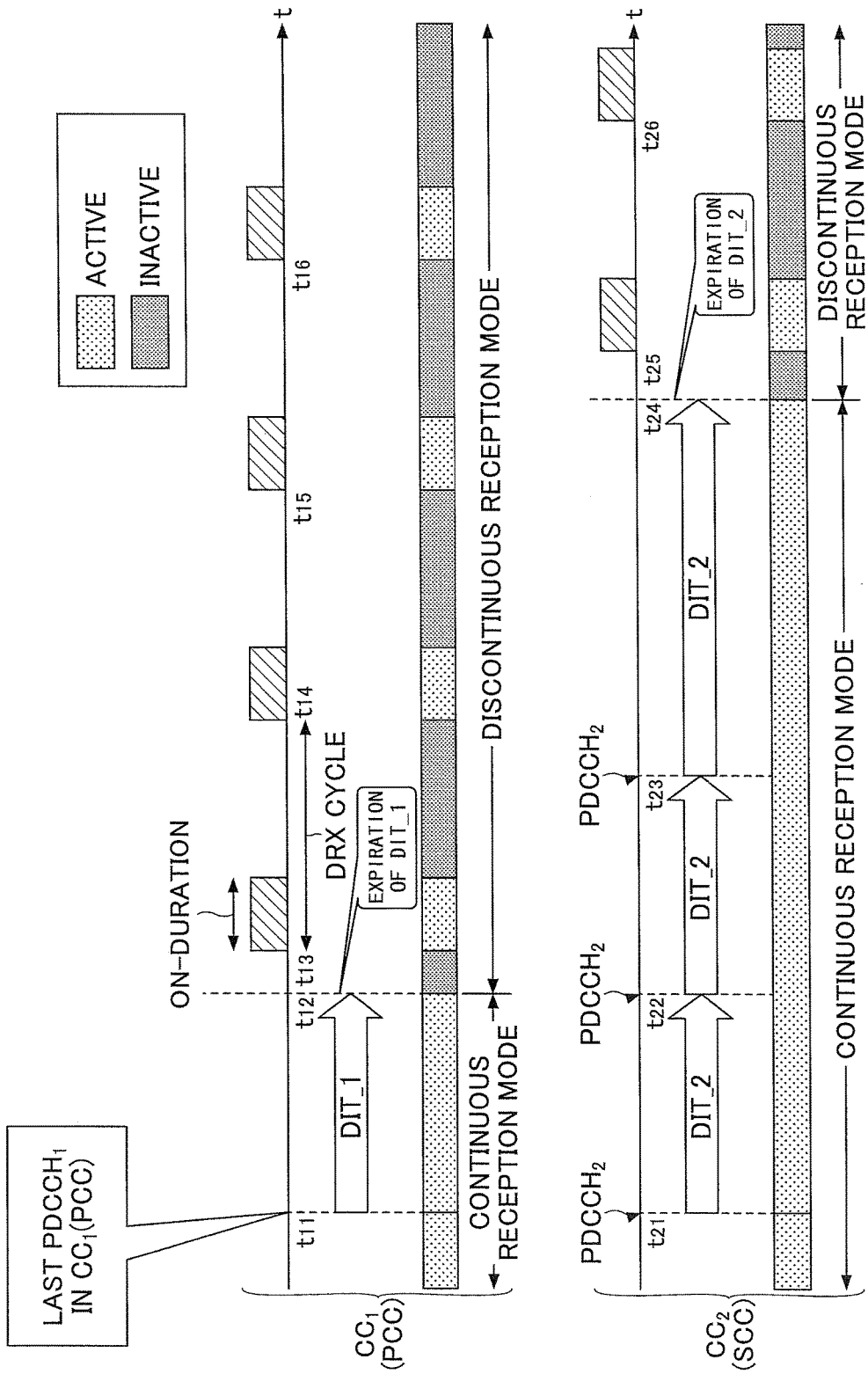
FIG. 11 is a diagram showing a situation in which the state transition is executed based on a timer.

FIG. 11 shows a situation in which the user equipment (UE) executes state transition based on the timer that is assigned for the corresponding component carrier (CC). This shows details of the operation example, the outline of which is explained by referring to FIG. 8. It is assumed that the user equipment (UE) is allowed to communicate by simultaneously using the primary component carrier (PCC) that is $CC_1$ and the secondary component carrier (SCC) that is $CC_2$.

As shown in the left side of the figure, the user equipment (UE) is operating in the continuous reception mode for both the $CC_1$ (PCC) and the $CC_2$ (SCC), and the UE is always in the active mode. In the $CC_1$ (PCC), the user equipment (UE) receives a downlink control signal ($PDCCH_1$) at $t_{11}$, and the user equipment (UE) activates the first timer DIT_1 in response to this. When the first timer DIT_1 is expired at $t_{12}$, the operation mode of the user equipment (UE) becomes the discontinuous reception mode for the $CC_1$. As a result, the $CC_1$, communication unit 101 is turned OFF during the offset time period after $t_{12}$. After $t_{13}$, for each DRX cycle, the operation mode transitions to the active mode only during the On-duration, and except for that, the operation mode transitions to the inactive mode.

For the $CC_2$, the user equipment (UE) receives a downlink control signal ($PDCCH_2$), and the user equipment (UE) activates the second timer DIT_2 in response to this. Prior to expiration of the second timer DIT_2, the user equipment (UE) receives a downlink signal ($PDCCH_2$) at $t_{22}$, the second timer DIT_2 is reset in response to this, and the second timer DIT_2 is restarted. Similarly, prior to expiration of the second timer DIT_2, the user equipment (UE) receives a downlink control signal (PDCCH$_2$) at t$_{23}$, the second timer DIT_2 is reset in response to this, and the second timer DIT_2 is restarted. When the second timer DIT_2 is expired at t$_{24}$, the mode of the user equipment (UE) for the CC$_2$ becomes the discontinuous reception mode. As a result, the CC$_2$ communication unit 102 is turned OFF during the offset time period after t$_{24}$. After t$_{25}$, for each DRX cycle, the operation mode becomes the active mode only during the On-duration, and except for that, the operation mode becomes the inactive mode. The timer DIT_1 for the CC$_1$ and the timer DIT_2 for the CC$_2$ are individually managed, and the CC$_1$ communication unit 101 and the CC$_2$ communication unit 102 switch operation modes in accordance with the corresponding timers. Specifically, note that, for the CC$_1$, the mode transitions to the discontinuous reception mode at t$_{12}$. However, at this point of time, the CC$_2$ is in the continuous reception mode.

Figure 12:
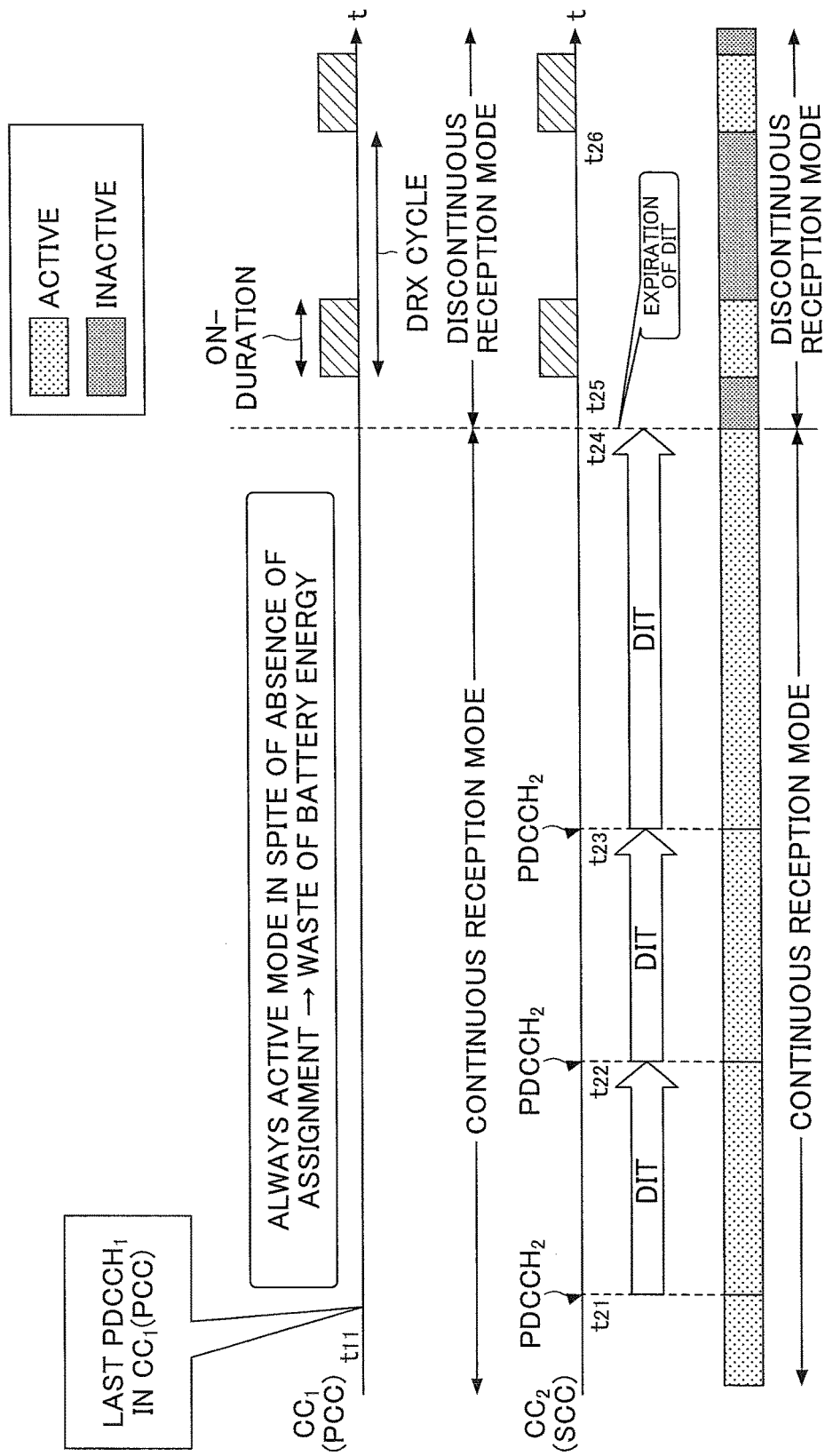
FIG. 12 is a diagram showing a situation in which timers are not managed for the corresponding CCs, and in which the state transition is executed based on a timer.

FIG. 12 shows a comparative operation example relative to FIG. 11. Unlike the example shown in FIG. 11, for the case of the example shown in FIG. 12, only the timer (DIT) that is common between the CC$_1$ (PCC) and the CC$_2$ (SCC) may be assigned. Accordingly, even if, for the CC$_1$, a significant time period is elapsed after receiving the downlink control signal (PDCCH$_1$), the mode of the user equipment (UE) may not transition to the discontinuous reception mode, provided that the communication is executed by utilizing the CC$_2$. When no downlink control signal is received during a predetermined time period for the CC$_1$ (PCC) and for the CC$_2$ (SCC), the mode of the user equipment (UE) transitions to the discontinuous reception mode for the first time. For the case of the depicted example, the mode of the user equipment (UE), both for the CC$_1$ and the CC$_2$, transitions to the discontinuous reception mode at the point of time of t$_{24}$. For the CC$_1$, even if no communication is executed after t$_{11}$, it is required to operate in the continuous reception mode after t$_{11}$ until t$_{24}$. Accordingly, it is required to continuously and wastefully operate the CC$_1$ communication unit 101 until t$_{24}$. It is disadvantageous from the perspective of the battery energy consumption. In contrast, for the case of the operation example shown in FIG. 11, the timer is assigned for each of the component carriers (CCs), and the operation mode is managed for each of the CCs. Accordingly, unlike the case of the example of FIG. 12, the modes of the CC$_1$ communication unit 101 and the CC$_2$ communication unit 102 can transition to the active mode for a necessary and sufficient time period. Except for that, the modes can transition to the inactive mode.

Figure 13:
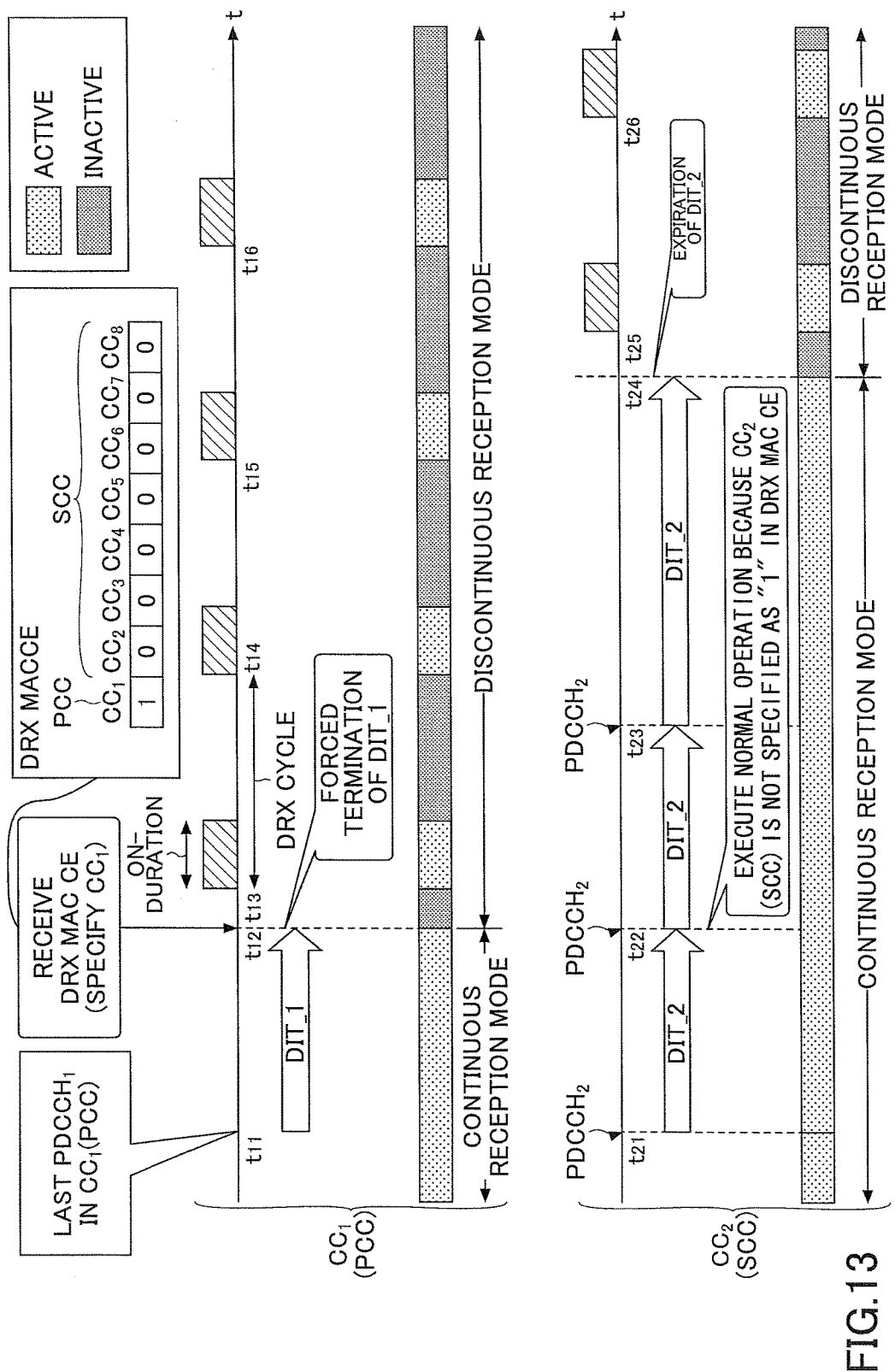
FIG. 13 is a diagram showing a situation in which the state transition is executed based on DRX_MAC_CE.

FIG. 13 shows a situation in which the user equipment (UE) executes state transition based on state control information (DRX_MAC_CE or DRX_Command_MAC_Control_Element) received from the base station (eNB). Similar to the case of the example shown in FIG. 11, it is assumed that the user equipment (UE) is allowed to communicate by simultaneously using the primary component carrier (PCC) that is the CC$_1$ and the secondary component carrier (SCC) that is the CC$_2$.

As shown in the left side of the figure, the user equipment (UE) is operating in the continuous reception mode for both the CC$_1$ (PCC) and CC$_2$ (SCC), and the mode is always the active mode. At t$_{11}$, the user equipment (UE) receives a downlink control signal (PDCCH$_1$) by utilizing the CC$_1$ (PCC) and the user equipment (UE) activates the first timer DIT_1 in response to this. Prior to expiration of the first timer DIT_1 at t$_{12}$, the user equipment (UE) receives a signal (DRX_MAC_CE or DRX_Command_MAC_Control_Element) including the state control information from the base station (eNB). The state control information shows, for each of the plurality of component carriers, whether the user equipment (UE) is to be operated in the discontinuous reception mode. For the case of the depicted example, the component carriers (CCs) currently used by the user equipment (UE) are the CC$_1$ and the CC$_2$. However, eight component carriers CC$_1$-CC$_8$ can be used by the whole communication system. For each of the eight CC$_1$-CC$_8$, the state control information indicates "1" or "0". For the case of the depicted example, "1" indicates that the mode is to be the discontinuous reception state, and "0" indicates that the mode is to be the continuous reception mode. However, a specific setting value is optional. Since the state control information indicates that, for the CC$_1$ (PCC), the mode is to be the discontinuous reception mode, and, for the CC$_2$ (SCC), the mode is to be the continuous reception mode, the mode of the user equipment (UE) transitions to the discontinuous reception mode for the CC$_1$ (PCC) after t$_{12}$, though the timer DIT_1 is not expired. As a result, the user equipment (UE) turns OFF the CC$_1$ communication unit 101 during the offset time period after t$_{12}$. After t$_{13}$, for each DRX cycle, the operation mode transitions to the active mode only during the On-duration, and except for that, the operation mode transitions to the inactive mode.

For the CC$_2$, the user equipment (UE) receives a downlink control signal (PDCCH$_2$) at t$_{21}$, and the user equipment (UE) activates the second timer DIT_2 in response to this. Since the state control information (DRX_MAC_CE or DRX_Command_MAC_Control_Element) received at t$_{12}$ indicates that the mode is to be the continuous reception mode for the CC$_2$, the user equipment (UE) continues the operation in the continuous reception mode as it is. Then, prior to expiration of the second timer DIT_2, the user equipment (UE) receives a downlink control signal (PDCCH$_2$) at t$_{22}$, the second timer DIT_2 is reset in response to this, and the second timer DIT_2 is restarted. Similarly, prior to the expiration of the second timer DIT_2, the user equipment (UE) receives a downlink control signal (PDCCH$_2$) at t$_{23}$, the second timer DIT_2 is reset in response to this, and the second timer DIT_2 is restarted. When the second timer DIT_2 is expired at t$_{24}$, the mode of the user equipment (UE) transitions to the discontinuous reception mode for the CC$_2$. As a result, the CC$_2$ communication unit 102 is turned OFF during the offset time period after t$_{24}$. After t$_{25}$, for each DRX cycle, the operation mode transitions to the active mode only during the On-duration, and except for that, the operation mode transitions to the inactive mode.

Unlike the example shown in FIG. 11 in which the user equipment (UE) autonomously controls the operation mode based on the timer, in the example shown in FIG. 13, the operation mode of the user equipment (UE) can be managed in accordance with an instruction from the base station (eNB).

Figure 14:
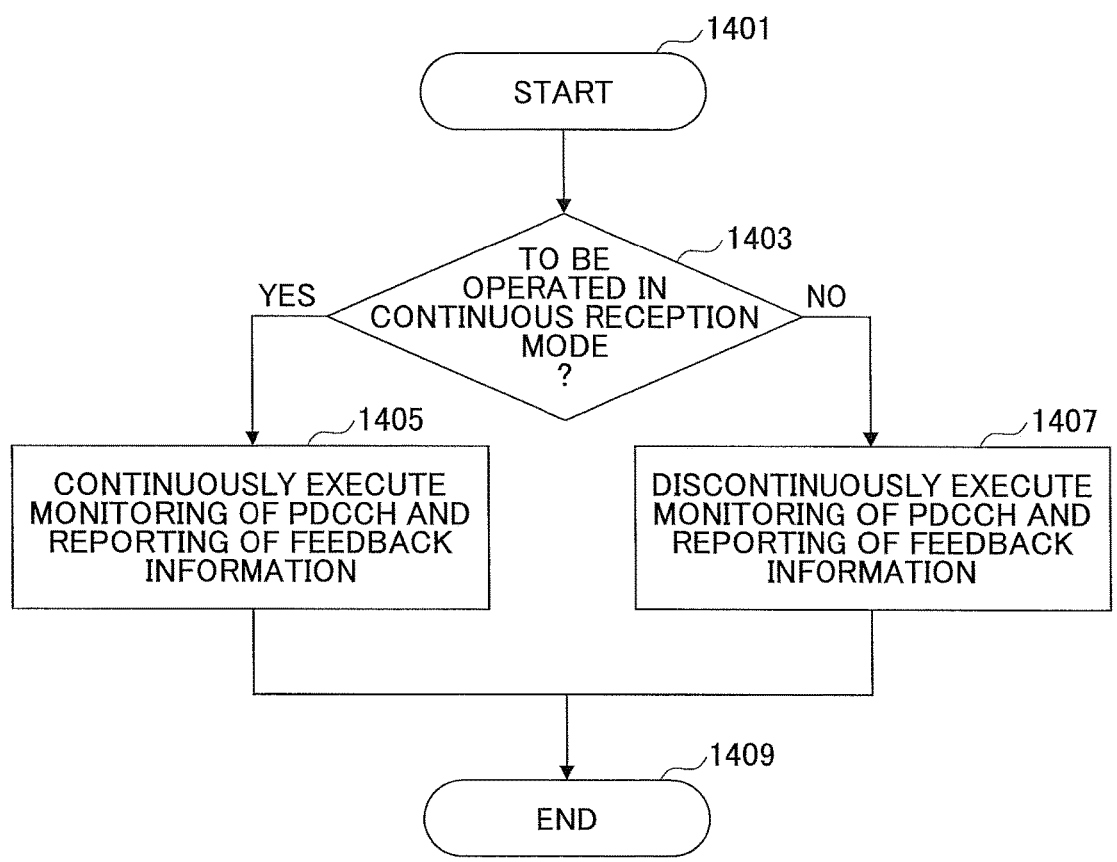
FIG. 14 is a flowchart showing an operation example of user equipment (UE).

FIG. 14 is a flowchart showing the operation examples in the user equipment (UE), which are explained by referring to FIGS. 11 to 13. The depicted operation example is executed regularly and/or irregularly (depending on necessity) for each of the plurality of component carriers (CC$_i$) that are the targets of the carrier aggregation (CA) (i=1, . . . , N).

The flow starts at step 1401, and the flow proceeds to step 1403.

At step 1403, the user equipment (UE) determines whether the user equipment (UE) is to be operated in the continuous reception mode by utilizing a CC$_i$. For the case of the example shown in FIG. 11, the determination at step 1403 is made, based on whether the timer DIT_i for the $CC_i$ is expired. When it is not expired, the user equipment (UE) is to be operated in the continuous reception mode. When it is expired, the user equipment (UE) is not to be operated in the continuous reception mode, and the user equipment (UE) is to be operated in the discontinuous reception mode. For the case of the example shown in FIG. 13, the determination at step 1403 is made, in accordance with the mode indicated by the state control information for the $CC_i$, namely, in accordance with whether the state control information indicates, for the $CC_i$, the continuous reception mode or the discontinuous reception mode. In either case, when the user equipment (UE) is to be operated in the continuous reception mode for the $CC_i$, the flow proceeds to step 1405.

At step 1405, the user equipment (UE) continuously executes reception of a down link control signal (e.g., PDCCH), reporting of feedback information (e.g., CQI, PMI, RI, or PTI), and so forth. The flow proceeds to step 1409, and the flow is completed.

At step 1403, when the user equipment (UE) is not to be operated in the continuous reception mode for the CC, (a case where it is to be operated in the discontinuous reception mode), the flow proceeds to step 1407.

At step 1407, the user equipment (UE) executes reception of a downlink control information (e.g., PDCCH), reporting of feedback information (e.g., CQI, PMI, RI, or PTI), and so forth, during the On-duration that occurs discontinuously. The flow proceeds to step 1409, and the flow is completed.

4. Modified Example

As described above, in principle, for each of the N component carriers ($CC_1$-$CC_N$), one timer DIT_1-N is assigned. However, a common timer DIT_C may be assigned to a plurality of secondary component carriers (SCC).

For example, as shown in FIG. 4, suppose that the user equipment (UE) is allowed to simultaneously use three component carriers $CC_A$, $CC_M$, and $CC_N$ by the carrier aggregation (CA). For the case of the example shown in FIG. 11, a timer DIT_A for the $CC_A$, a timer DIT_M for the $CC_M$, and a timer DIT_N for the $CC_N$ are individually assigned, and the $CC_A$ communication unit, the $CC_M$ communication unit, and the $CC_N$ communication unit are individually controlled by the timers DIT_A, DIT_M, and DIT_N, respectively. However, the present invention is not limited to this example. For example, the timer for the $CC_M$ and the timer for the $CC_N$ may be a common timer DIT_X. In this case, the $CC_A$ communication unit corresponding to the $CC_A$ is controlled by the timer DIT_A, and the $CC_M$ communication unit and the $CC_N$ communication unit corresponding to the $CC_M$ and the $CC_N$ are commonly controlled by the timer DIT_X. Accordingly, for the whole frequency band of 2 GHz of FIG. 4, the user equipment (UE) simultaneously transitions to the continuous reception mode or the discontinuous reception mode. In this case, it can be said that the $CC_M$ and the $CC_N$ are grouped. Such grouping of the CCs is not limited to the example shown in FIG. 11 in which the timer is utilized. The grouping of the CCs can also be executed in accordance with an instruction from the base station (eNB), as shown in FIG. 13. In such a case, the state control information (DRX_MAC_CE or DRX_Command_MAC_Control_Element) may indicate the same value for the grouped CCs.

A combination of CCs that is grouped by commonly assigning a timer is not limited to that of within the same frequency band, and it can be a combination of component carriers that belong to corresponding different frequency bands. A timer can be commonly assigned to a plurality of optional CCs. However, at least for the PCC, a timer that is independent from that of SCCs may preferably be assigned, and the plurality of the SCCs may preferably be grouped. Among the plurality of the SCCs, a SCC that becomes unnecessary may be deleted or deactivated, and thereby the SCC can be excluded from the targets of the carrier aggregation (CA). In contrast, since the PCC is a CC that is for securing the connection of the user equipment (UE), the PCC may not be deleted or deactivated. Accordingly, the timer for the PCC may preferably be assigned separately from that of the SCCs, and an optimized DRX control may preferably be executed for the PCC.

As described above, for each of the SCCs, it is technically possible to switch between a state in which communication is enabled and a state in which communication is disabled by activation and deactivation. Once a SCC becomes out of the target of the CA by the deactivation, an activation process may be required for setting the SCC as the target of the CA again. Consequently, in order to add the SCC, a control may be delayed and a processing load may be applied. In contrast, as in the embodiment of the present invention, when a mode of a SCC that is infrequently used is set to be the discontinuous reception mode, in order to set the mode of the SCC to be the continuous reception mode, the base station (eNB) may report it to the user equipment (UE) during the time period in which the mode discontinuously transitions to the active mode (the ON-duration). Accordingly, the SCC can be quickly used. In this manner, according to the embodiment of the present invention, the battery saving effect of the user equipment (UE) can be enhanced compared to that of the related art, by individually controlling the operation mode of the user equipment (UE) for each of the plurality of CCs.

Hereinabove, the present invention is explained by referring to the specific embodiment. However, the embodiment is merely illustrative, and various variations, modifications, alterations and substitutions could be conceived by those skilled in the art. For example, the present invention may be applied to any suitable mobile communication system that executes the carrier aggregation. Specific example of numerical values are used in order to facilitate understanding of the invention. However, these numerical values are simply illustrative, and any other appropriate values may be used, except as indicated otherwise. The separations of the examples or the items are not essential to the present invention. Depending on necessity, subject matter described in two or more examples or items may be combined and used, and subject matter described in an item may be applied to subject matter described in another item (provided that they do not contradict). A boundary of a functional unit or a processing unit in a functional block may not correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like. The present invention is not limited to the above-described embodiment, and various variations, modifications, alterations, substitutions and so on are included, without departing from the scope of the present invention.

The present international application is based on and claims the benefit of priority of Japanese Patent Application No. 2012-059343, filed on Mar. 15, 2012, the entire contents of which are hereby incorporated by reference.

The invention claimed is:

1. User equipment capable of communicating by using N component carriers (CCs) through carrier aggregation, the user equipment comprising:
   N communication units configured to execute radio communication with a base station by using each of the N CCs;
   a controller configured to individually control an operation mode of each of the N communication units; and
   a plurality of timers, each configured to report to the controller that a constant time period has elapsed without receiving a further control signal, after receiving, by a communication unit of the N communication units, a control signal from the base station,
   wherein N is greater than or equal to 2,
   wherein, in response to detecting that a report from a first timer of the plurality of timers is received for a first communication unit of the N communication units, the controller is configured to control the operation mode of the first communication unit such that the first communication unit transitions to discontinuous reception mode, and
   wherein a specific plurality of communication units belonging to the N communication units, the specific plurality of communication units not including the first communication unit, is grouped such that operation modes of the specific plurality of communication units simultaneously transition to discontinuous reception modes, in response to detecting that a report from a second timer of the plurality of timers, the second timer being different from the first timer, is received for one of the specific plurality of communication units.

2. The user apparatus according to claim 1,
   wherein one of the N component carriers is a primary component carrier, and is used for communicating control information, and
   wherein another one or more of the N component carriers other than the one of the N component carriers are secondary component carriers, and are used for communicating user data.

3. The user equipment according to claim 2, wherein, in response to detecting that control information received from the base station by utilizing the primary component carrier includes state control information indicating whether, for each of the N communication units, an operation mode is to be discontinuous reception mode, the controller is configured to control the operation modes of the N communication units in accordance with the state control information.

4. A discontinuous reception control method to be executed by user equipment capable of communicating by using N component carriers through carrier aggregation, the method comprising:
   reporting, by a first timer of a plurality of timers, to a controller that a constant time period has elapsed without receiving a further control signal, after receiving, by a first communication unit belonging to N communication units, a control signal from a base station; and
   controlling, by the controller, of an operation mode of the first communication unit, in response to detecting that a report from the first timer is received by the controller that individually controls an operation mode of each of the N communication units such that the first communication unit transitions to discontinuous reception mode,
   wherein N is greater than or equal to 2;
   wherein a specific plurality of communication units belonging to the N communication units, the specific plurality of communication units not including the first communication unit, is grouped such that operation modes of the specific plurality of communication units simultaneously transition to discontinuous reception modes, in response to detecting that a report from a second timer of the plurality of timers, the second timer being different from the first timer, is received for one of the specific plurality of communication units.

* * * * *